United States Patent Office 3,236,846
Patented Feb. 22, 1966

3,236,846
ALKANOYLAMINO-1,3,5-TRIAZINES
Enrico Knüsli, Riehen, near Basel, Jürg Rumpf, Binningen, near Basel, and Hans Gysin, Basel, Switzerland, assignors to J. R. Geigy A.-G., Basel, Switzerland
No Drawing. Filed June 10, 1963, Ser. No. 286,495
Claims priority, application Switzerland, Nov. 5, 1958, 65,810/58
11 Claims. (Cl. 260—249.8)

The present application is a continuation-in-part of our patent application Serial No. 848,226 filed on October 23, 1959, now abandoned, and of our pending application Serial No. 66,946 filed November 3, 1960, now abandoned, as a continuation-in-part of application 848,226 supra, and our pending application Serial No. 265,055 filed on March 14, 1963, as a continuation application of said application 848,226 supra.

This invention relates to certain new triazine derivatives. Known 1,3,5-triazines (s-triazines) of the general formula

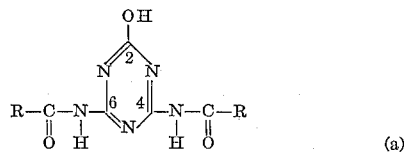

wherein R is hydrogen or alkyl or alkenyl, particularly with 1 to 17 carbon atoms, have been recommended as being useful bactericides, insecticides, and intermediates in the preparation of dyestuffs, pharmaceuticals and other industrial products.

On the other hand, s-triazines of the formula

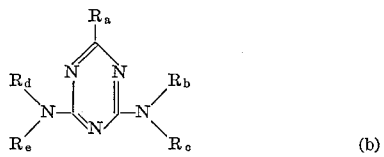

wherein $R_a$ is a hydrocarbon and more specifically a lower alkyl radical, linked directly or via an oxygen or sulphur atom to the s-triazine nucleus, and $R_b$, $R_c$, $R_d$ and $R_e$ are either hydrogen or a hydrocarbon, especially a lower alkyl such as the ethyl radical, have been described as useful herbicidal agents.

It has been found further that neither the compounds of Formula a nor those in which the hydroxyl group in 2-position in Formula a is replaced by alkyl, especially methyl, nor those of Formula a in which the two hydrogen atoms of the —NH— bridges are each replaced by an alkyl group, especially an ethyl group, are suitable for use as herbicides in agriculture. Nor are compounds of the formula

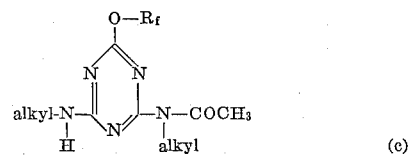

wherein $R_f$ is a alkyl radical which has more than 3 carbon atoms, of practical use as herbicides for agricultural purposes.

However, we have found that unexpectedly a small class of certain novel acylamino-substituted s-triazines, namely the compounds of the formula

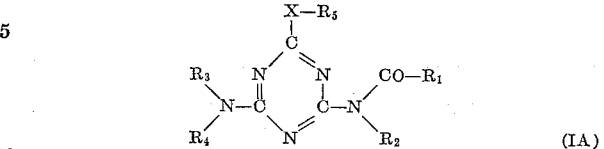

wherein

X represents an oxygen or sulphur atom,
$R_1$ represents an alkyl radical with from 2 to 4 carbon atoms,
$R_2$ represents a lower alkyl radical, a lower alkenyl radical or a lower alkoxyalkyl radical,
$R_3$ represents a lower alkyl, lower alkenyl or lower alkanoyl radical,
$R_4$ represents hydrogen or a lower alkyl, lower alkenyl or lower alkoxyalkyl radical, and
$R_5$ represents an alkyl radical with from 1 to 3 carbon atoms, or a lower alkenyl radical, preferably, with from 3 to 4 carbon atoms, or a lower alkoxyalkyl radical preferably with from 1 to 3 carbon atoms in each of the alkoxy and alkyl portions of the radical, are of strong herbicidal activity and, therefore, excellently suited for use as herbicidal agents in agriculture, while, at the same time, these compounds possess neither usefulness as bactericides or insecticides, nor are they useful as textile assistants.

We have further found that compounds of the formula

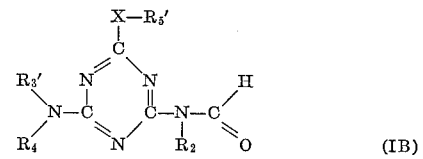

wherein

X, $R_2$ and $R_4$ have the above-given meanings,
$R_3'$ is lower alkyl, lower alkenyl, or an alkanoyl radical with at least 2 and up to 4 carbon atoms, and
$R_5'$ is lower alkyl, lower alkenyl or lower alkoxyalkyl, are also very well suited for use as herbicides, but of no practical usefulness as bactericides, or insecticides, or as textile assistants.

Other new compounds pertaining to a broader class according to the present invention, the structure of which corresponds to that of the compounds of Formula IA except that in lieu of $R_3'$ they possess another

substituent, may be used, for example as biocidally active ingredients, for instance as bactericides apart from their use as agents for inhibiting the growth of plants, especially as weed killers.

Some of the new compounds, namely those corresponding in structure to Formula I, but wherein $R_5'$ is replaced by a corresponding radical with 4 carbon atoms, are also useful chemicals in the textile industry, for instance as softening agents, antioxidants and other textile assistants.

They can also be employed as constituents of polishing waxes, coatings, castings, as corrosion inhibitors, plasticizers, as additives for lubricants and petroleum products and as intermediates in the preparation of other technical compounds, drugs, synthetic resins etc.

By the term "lower" radicals are meant those radicals which contain 1 to 4 carbon atoms in the alkyl, alkenyl or alkanoyl group or which contain from 1 to 4 carbon atoms both in the alkoxy- as well as the alkyl portion of the alkoxyalkyl radicals. Illustrative examples of lower alkyl radicals are: methyl-, ethyl-, n-propyl-, isopropyl- and butyl-radicals. Illustrative examples of lower alkenyl radicals are the vinyl-, propenyl-, methallyl- and preferably the allyl radical. Among the lower alkoxyalkyl radicals may be cited the methoxymethyl, methoxyethyl, ethoxyethyl, γ-methoxypropyl and γ-ethoxypropyl radicals etc. The preferred alkanoyl radical $R_3$ is the acetyl radical $CH_3CO-$.

Particularly valuable compounds of the general Formula IA are those, in which $R_1$ is a lower alkyl radical, especially methyl, $R_2$ is a lower alkyl radical, $R_3$ is a lower alkyl or alkanoyl radical, $R_4$ represents hydrogen or a lower alkyl radical, X represents an oxygen atom, and $R_5$ is a lower alkyl radical of 1 to 3 carbon atoms.

As can be seen from the above Formulas IA and IB, at least one of the two amino groupings attached to the triazine nucleus must be disubstituted and therefore may not bear a hydrogen atom.

In order to prepare the new triazine derivatives of the Formulas IA, IB and the other novel compounds described above which are distinguished from the compounds of these formulas by $R_3'$ being replaced by

or $R_5'$ being replaced by a corresponding radical with 4 carbon atoms, respectively, all of which are comprised by the general formula

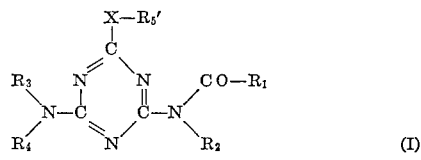

wherein

X represents an oxygen or sulphur atom, $R_1$ represents a lower alkyl radical, or hydrogen, $R_2$ represents a lower alkyl radical, a lower alkenyl radical or a lower alkoxyalkyl radical, $R_3$ represents lower alkyl, lower alkenyl or lower alkanoyl radical, $R_4$ represents hydrogen or a lower alkyl, lower alkenyl or lower alkoxyalkyl radical, and $R_5'$ represents a lower alkyl, lower alkenyl or lower alkoxyalkyl radical, compounds of the general formula

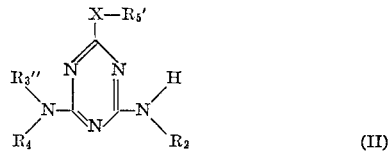

wherein $R_3''$ represents hydrogen or a radical corresponding to the definition for $R_3$ with the exception of a low molecular alkanoyl radical, and X, $R_2$, $R_4$ and $R_5'$ have the meanings given above, are reacted with a reactive functional derivative of a low molecular alkanoic acid, in particular with an an-hydride, for example, with acetanhydride, proprionic acid, butyric acid or isobutyric acid anhydride and also, as reactive derivative of formic acid to introduce the formyl radical, with formic acid-acetic acid anhydride. If in the starting materials $R_3'$ is hydrogen, then, depending on the reaction conditions, e.g., time and temperature, monoacyl or diacyl derivatives can be obtained.

Suitable materials of the general Formula II are, for example:

2-methoxy-4-amino-6-ethylamino-s-triazine,
2-methoxy-4-amino-6-isopropylamino-s-triazine,
2-methoxy-4-amino-6-allylamino-s-triazine,
2-methoxy-4-amino-6-(γ-isopropoxy-propylamino)-s-triazine,
2-methoxy-4.6-bis-ethylamino-s-triazine,
2-methoxy-4-methyl-amino-6-isopropylamino-s-triazine,
2-methoxy-4-ethylamino-6-isopropylamino-s-triazine,
2-methoxy-4.6-bis-n-propylamino-s-triazine,
2-methoxy-4.6-bis-isopropylamino-s-triazine,
2-methoxy-4.6-bis-n-butylamino-s-triazine,
2-methoxy-4.6-bis-allylamino-s-triazine,
2-methoxy-4.6-bis-methallylamino-s-triazine,
2-methoxy-4.6-bis-(β-methoxy-ethylamino)-s-triazine,
2-methoxy-4.6-bis-(γ-methoxy-propylamino)-s-triazine,
2-methoxy-4-ethylamino-6-diethylamino-s-triazine,
2-methoxy-4-isopropylamino-6-diethylamino-s-triazine,
2-ethoxy-4.6-bis-ethylamino-s-triazine,
2-ethoxy-4.6-bis-isopropylamino-s-triazine,
2-n-propoxy-4.6-bis-ethylamino-s-triazine,
2-allyloxy-4.6-bis-ethylamino-s-triazine,
2-methoxyethoxy-4.6-bisethylamino-s-triazine,
2-ethoxyethoxy-4.6-bis-ethylamino-s-triazine,
2-methylmercapto-4.6-bis-ethylamino-s-triazine,
2-methylmercapto-4.6-bis-isopropylamino-s-triazine,
2-methylmercapto-4.6-bis-allylamino-s-triazine,
2-methylmercapto-4.6-bis-(γ-methoxypropylamino)-s-triazine,
2-isopropylmercapto-4.6-bis-ethylamino-s-triazine and
2-allylmercapto-4.6-bis-ethylamino-s-triazine. The greater part of these starting materials is known, the others are produced by known methods.

The following examples illustrate the preparation of the new triazine derivatives according to the invention. Parts are given therein as parts by weight and the temperatures are in degrees centigrade. Percentages are also given by weight unless stated otherwise. "Sq. m." stands for square meter.

*Example I*

20 parts of 2-methoxy-4.6-bis-ethylamino-s-triazine are refluxed for 5 hours with 100 parts of acetanhydride. The excess acetanhydride and the acetic acid formed are then distilled off in the vacuum and the residue is rectified. 2-methoxy-4.6-bis-(N-acetyl-ethylamino)-s-triazine passes over at 138–142° under 0.001 mm. pressure.

The following compounds are obtained in an analogous manner:

2-methoxy-4-isopropylamino-6-(N-acetyl-isopropylamino)-s-triazine,
 B.P.$_{0.4}$ 136–140°, M.P. 102–104°,
2-methoxy-4-n-propylamino-6-(N-acetyl-n-propylamino)-s-triazine,
2-methoxy-4-diethylamino-6-(N-acetyl-ethylamino)-s-triazine, B.P.$_{0.003}$ 141–144°,
2-ethoxy-4.6-bis-(N-acetyl-ethylamino)-s-triazine,
 B.P.$_{0.004}$ 150–153°,
2-ethoxy-4-isopropylamino-6-(N-acetyl-isopropylamino)-s-triazine,
2-ethoxy-4-n-butylamino-6-(N-acetyl-n-butylamino)-s-triazine,
2-n-propoxy-4.6-bis-(N-acetyl-ethylamino)-s-triazine,
 B.P.$_{0.001}$ 139–142°,
2-allyloxy-4.6-bis-(N-acetyl-ethylamino)-s-triazine,
 B.P.$_{0.0002}$ 168°, 2-methoxyethoxy-4.6-bis-(N-acetyl-ethylamino)-s-triazine, 2-ethoxyethoxy-4.6-bis-(N-acetyl-ethylamino)-s-triazine, B.P.$_{0.0004}$ 170–178°, 2-methylmercapto-4-ethylamino-6-(N-acetyl-ethylamino)-s-triazine, M.P. 98–100° (from cyclohexane), 2-methylmercapto-4-isopropylamino-6-(N-acetyl-isopropylamino)-s-triazine, 2-isopropylmercapto-4-ethylamino-6-(N-acetyl-ethylamino)-s-triazine, and 2-methoxy-4-allylamino-6-(N-acetyl-allylamino)-s-triazine.

*Example II*

22.8 parts of 2-methoxy-4.6-bis-isopropylamino-s-triazine are refluxed for 48 hours in 150 parts of acetanhydride. The acetic acid and the excess acetanhydride are distilled off in the vacuum and the residue is rectified in a high vacuum whereupon 2-methoxy-4.6-bis-(N-acetyl-isopropylamino)-s-triazine is obtained. B.P.$_{0.06}$ 130–134°.

The following compounds are obtained in an analogous manner:

2-methoxy-4.6-bis-(N-acetyl-γ-methoxy-propylamino)-s-triazine, B.P.$_{0.004}$ 176–178°, 2-ethoxy-4.6-bis-(N-acetyl-β-methoxy-ethylamino)-s-triazine, 2-methylmercapto-4.6-bis-(N-acetyl-ethylamino)-s-triazine, B.P.$_{0.015}$ 164°, 2-methoxy-4-acetylamino-6-(N-acetyl-ethylamino)-s-triazine, M.P. 98° (from cyclohexane), 2-methoxy-4.6-bis-(N-propionyl-ethylamino)-s-triazine, B.P.$_{0.01}$ 142–143°, 2-methoxy-4.6-bis-(N-n-butyryl-ethylamino)-s-triazine, B.P.$_{0.008}$ 159–162°, 2-methoxy-4.6-bis-(N-isobutyryl-ethylamino)-s-triazine, B.P.$_{0.03}$ 162°, 2-ethoxy-4-isopropylamino-6-(N-acetyl-isopropylamino)-s-triazine, M.P. 95–96°, 2-n-butoxy-4.6-bis-(N-acetyl-ethylamino)-s-triazine, B.P.$_{0.08}$ 142–156°, 2-n-butoxy-4-ethylamino-6-(N-acetyl-ethylamino)-s-triazine, M.P. 71–72°.

*Example III*

239 parts of 2-methoxy-4-diethylamino-6-isopropylamino-s-triazine are dissolved in 204 parts of acetanhydride and the solution is refluxed for 36 hours. The acetic acid and the acetanhydride are distilled off in the vacuum and the residue is distilled at 150° under 0.1 mm. pressure.

The distillation residue is again refluxed for 20 hours with 200 parts of acetanhydride and is then worked up as described above. 175 parts of 2-methoxy-4-diethylamino-6-(N-acetyl-isopropylamino)-s-triazine which boils at 148° under 0.05 mm. pressure are obtained.

*Example IV*

330 parts of acetanhydride are added to 211 parts of 2-methoxy-4-ethylamino-6-isopropylamino-s-triazine and the whole is refluxed for 20 hours. The acetanhydride and acetic acid are then distilled off. The same process is repeated with 200 parts of acetanhydride (15 hours) and 100 parts of acetanhydride (2 hours). The crude product is dissolved in 400 parts of ether and then stirred for 3 hours with 100 parts of 5% sodium carbonate solution. After separating the phases, the ethereal phase is washed first with 40 parts of sodium carbonate solution, then with 300 parts of 4 N-hydrochloric acid and then with 150 parts of water, these latter three liquids being used in portions. After drying over sodium sulphate, the ether is distilled off and the 2-methoxy-4-(N-acetyl-ethylamino)-6-(N-acetyl-isopropylamino)-s-triazine is dried in a high vacuum at 75° under 0.01 mm. pressure. B.P.$_{0.0005}$ 122–124°.

2-ethoxy-4.6-bis-(N-acetyl-isopropylamino)-s-triazine, produced in an analogous manner, boils at 148–153° under 0.006 mm. pressure.

*Example V*

89 parts of acetanhydride and 43 parts of formic acid are heated for 2 hours at 50–60°, then cooled and 40 parts of 2-methoxy-4.6-bis-ethylamino-s-triazine and 100 parts of ether are added. The reaction mixture is then stirred for 84 hours at 20°, then for 2 hours at 60° whereupon the solvents are distilled off, finally in the vacuum. The residue is recrystallised first from cyclohexane, then from hexane and finally from isopropyl ether. The 2-methoxy-4-ethylamino-6-(N-formyl-ethylamino)-s-triazine melts at 99–101°.

2-methylmercapto-4-ethylamino-6-(N-formyl-ethylamino)-s-triazine (M.P. 107–110° from cyclohexane) is produced in an analogous manner.

In the table below data revealing the herbicidal activity of the compounds according to the invention have been compiled, and compared with data of structurally closely related compounds of Formulas *a* and *b*.

The following compounds were tested:

Compounds according to the invention, falling under Formula I:

I 2-methoxy-4,6-bis-(N-acetyl-ethylamino)-s-triazine
II 2-ethoxy-4,6-bis-(N-acetyl-ethylamino)-s-triazine
III 2-methoxy-4,6-bis-(N-acetyl-isopropylamino)-s-triazine
IV 2-ethoxy-4,6-bis-(N-acetyl-isopropylamino)-s-triazine
V 2-methylthio-4-ethylamino-6-(N-acetyl-ethylamino)-s-triazine Compounds falling under Formulas *a*, *b* and *c*:

VI 2-hydroxy-4,6-bis-(N-acetylamino)-s-triazine
VII 2-methyl-4,6-bis-(N-acetylamino)-s-triazine
VIII 2-hydroxy-4,6-bis-(N-acetyl-ethylamino)-s-triazine
IX 2-allyloxy-4,6-bis-(N-acetylamino)-s-triazine
X 2-butoxy-4-(N-acetyl-ethylamino)-6-ethylamino-s-triazine.

The tests were carried out as follows:

One of the test compounds enumerated above was admixed with six individual plots of soil in a ratio corresponding to 10 lbs. of test compound per acre of soil. Seeds of one each of the following six test plants were then planted and allowed to germinate in the six individual plots of soil. The growth of the germinated seedlings was compared after twenty days with the growth of control seedlings germinated in untreated soil.

The growth was rated according to the scale published in "The Chemistry and Mode of Action of Herbicides," by A. S. Crafts, Interscience Publ., 1961, pages 106 and 178, which is the following:

10=normal growth
9–7=weak growth inhibition
6–4=medium growth inhibition
3–1=strong growth inhibition
0=dead plants.

The treated plants representative of several classes of weeds were: oats, ray grass, mustard, cucumber, vetch (Vicia) and sugar beet, the latter being particularly sensitive to even weak herbicidal activity.

TABLE

| Tested plant | Compounds, No. | | | | | | | | | |
|---|---|---|---|---|---|---|---|---|---|---|
| | I | II | III | IV | V | VI | VII | VIII | IX | X |
| Oats | 0 | 0 | 0 | 0 | 0 | 10 | 9 | 9 | 9 | 10 |
| Ray grass | 0 | 0 | 0 | 0 | 0 | 10 | 10 | 10 | 10 | 10 |
| Mustard | 0 | 0 | 0 | 0 | 0 | 10 | 10 | 10 | 4 | 7 |
| Cucumber | 0 | 0 | 0 | 0 | 0 | 10 | 10 | 10 | 9 | 10 |
| Vetch | 0 | 0 | 0 | 0 | 0 | 10 | 10 | 10 | 10 | 10 |
| Sugar beet | 0 | 0 | 0 | 0 | 0 | 10 | 10 | 10 | 7 | 5 |

The above data clearly show that the Compounds I to V are very well suited for use as herbicidal agents in agriculture while Compounds VI to X are completely unsuited for such purposes.

Furthermore, in a field test, various cultivated plants were sown in May in slightly marly sandy soil containing little organic matter (not fertilised).

One day later, the plots were treated with 0.2 liter per sq. m. of a suspension containing 0.05% of 2-methoxy-4-(N-acetylethylamino)-6-(N-acetyl-isopropylamino) - s - triazine prepared from 50% wettable powder (0.1 g. active substance per sq. m.=about 0.9 lb. per acre). On evaluating the test two months later, 98% of the annual weeds in the plots treated had been destroyed, whilst the cultivated plants, flax, peas, spinach and potatoes were not affected.

In all, 128.5 mm. rain fell during the test period, 101.1 mm. of which fell in 10 successive days. The plots were sprayed when no rain fell.

We claim:
1. A triazine derivative of the formula

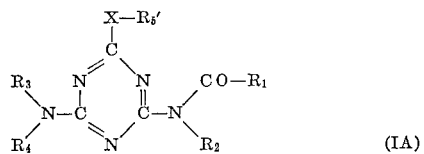

in which formula

X represents a member selected from the group consisting of oxygen and sulfur,
$R_1$ represents alkyl with from 2 to 4 carbon atoms,
$R_2$ represents a member selected from the group consisting of lower alkyl, lower alkenyl and lower alkoxyalkyl,
$R_3$ represents a member selected from the group consisting of lower alkyl, lower alkenyl and lower alkanoyl
$R_4$ represents a member selected from the group consisting of hydrogen, lower alkyl, lower alkenyl and lower alkoxyalkyl, and
$R_5$ represents a member selected from the group consisting of alkyl with not more than 3 carbon atoms, alkenyl with from 3 to 4 carbon atoms and alkoxyalkyl with from 1 to 3 carbon atoms in each of the lower alkoxy and the alkyl portion thereof.

2. 2-methoxy-4,6-bis-(N-acetyl-ethylamino)-s-triazine
3. 2-methoxy-4-(N-acetyl-ethylamino)-6-(N-acetyl - isopropylamino)-s-triazine
4. 2-methoxy-4,6-bis - (N - acetyl-isopropylamino) - s-triazine
5. 2-methoxy-4-diethylamino-6-(N - acetyl - isopropylamino)-s-triazine
6. 2-methoxy-4-ethylamino-6-(N-formyl-ethylamino)-s-triazine
7. 2-methoxy-4,6-bis-(N-propionyl-ethylamino)-s - triazine
8. 2-ethoxy-4,6-bis-(N-acetyl-ispropylamino)-s-triazine
9. 2-ethoxy-4,6-bis-(N-acetyl-ethylamino)-s-triazine
10. 2-methylmercapto-4-ethylamino-6-(N-acetyl - ethylamino)-s-triazine
11. A triazine derivative of the formula

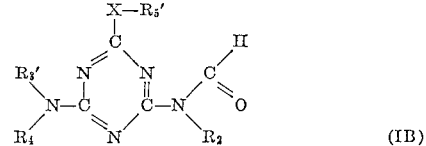

in which formula

X represents a member selected from the group consisting of oxygen and sulfur,
$R_2$ represents a member selected from the group consisting of lower alkyl, lower alkenyl and lower alkoxyalkyl,
$R_3'$ represents a member selected from the group consisting of lower alkyl, lower alkenyl and lower alkanoyl with from 2 to 4 carbon atoms,
$R_4$ represents a member selected from the group consisting of hydrogen, lower alkyl, lower alkenyl and lower alkoxyalkyl, and
$R_5'$ represents a member selected from the group consisting of lower alkyl, lower alkenyl and lower alkoxyalkyl.

References Cited by the Examiner
UNITED STATES PATENTS

| 2,273,687 | 2/1942 | Bock | 260—249.8 |
| 2,762,695 | 9/1956 | Gerjovich et al. | 71—2.6 |
| 2,762,696 | 9/1956 | Gerjovich et al. | 71—2.6 |
| 2,909,420 | 10/1959 | Gysin et al. | 260—249.8 X |
| 2,996,505 | 8/1961 | Schwarze | 260—249.8 |

OTHER REFERENCES

Smolin et al., "s-Triazines and Derivatives," Interscience Pub. Inc., N.Y., 1959, pages 235, 251, 252 and 333–337.

JOHN D. RANDOLPH, *Acting Primary Examiner.*
NICHOLAS S. RIZZO, WALTER A. MODANCE,
*Examiners.*